United States Patent
Yu et al.

(10) Patent No.: US 11,733,026 B2
(45) Date of Patent: Aug. 22, 2023

(54) SINGLE-BEAM THREE-DEGREE-OF-FREEDOM HOMODYNE LASER INTERFEROMETER BASED ON ARRAY DETECTOR

(71) Applicant: Harbin Institute of Technology, Harbin (CN)

(72) Inventors: Liang Yu, Harbin (CN); Pengcheng Hu, Harbin (CN); Xionglei Lin, Harbin (CN); Xiaobo Su, Harbin (CN)

(73) Assignee: HARBIN INSTITUTE OF TECHNOLOGY, Heilongjiang (CN)

( * ) Notice: Subject to any disclaimer, the term of this patent is extended or adjusted under 35 U.S.C. 154(b) by 0 days.

(21) Appl. No.: 17/681,148

(22) Filed: Feb. 25, 2022

(65) Prior Publication Data
US 2022/0290969 A1 Sep. 15, 2022

(30) Foreign Application Priority Data
Mar. 9, 2021 (CN) .......................... 202110252643.5

(51) Int. Cl.
*G01B 9/02* (2022.01)
*G01B 11/00* (2006.01)
*G01B 11/26* (2006.01)

(52) U.S. Cl.
CPC .......... *G01B 9/02* (2013.01); *G01B 9/02083* (2013.01); *G01B 11/005* (2013.01); *G01B 11/26* (2013.01)

(58) Field of Classification Search
CPC .... G01B 9/02; G01B 9/02083; G01B 11/005; G01B 11/26
See application file for complete search history.

(56) References Cited

U.S. PATENT DOCUMENTS

| 5,243,542 | A | * | 9/1993 | Noguchi | ............... | G01B 11/161 356/343 |
| 2004/0027583 | A1 | * | 2/2004 | Dulman | ............. | G01B 11/2441 356/511 |

(Continued)

FOREIGN PATENT DOCUMENTS

| CN | 110701998 A | 1/2020 | |
| EP | 2120005 A1 * | 11/2009 | ............. G01B 11/14 |

OTHER PUBLICATIONS

Gregorcic, Peter et al. "Quadrature phase-shift error analysis using a homodyne laser interferometer". Optics Express, vol. 17, Issue 18, Aug. 31, 2009, pp. 16322-16331. (Year: 2009).*

(Continued)

*Primary Examiner* — Michael A Lyons
(74) *Attorney, Agent, or Firm* — WPAT, PC

(57) ABSTRACT

A single-beam three-degree-of-freedom homodyne laser interferometer based on an array detector. A single-frequency laser beam is input to a Michelson interference structure, the measurement beam and the reference beam perform non-coaxial interference and form a single-beam homodyne interference signal by setting the angle of a reference plane mirror, the array detector is selected to effectively receive the single-beam homodyne interference signal, and finally, three-degree-of-freedom signal linear decoupling on the single-beam homodyne interference signal is achieved through a three-degree-of-freedom decoupling method based on Lissajous ellipse fitting. The laser interferometer does is free of angle decoupling nonlinearity, the period nonlinear error is remarkably reduced, compared with other existing three-degree-of-freedom laser interferometers, the laser interferometer has the advantages of being simple in structure, large in angle measurement range and easy to integrate, and the high-precision requirement of the (Continued)

three-degree-of-freedom laser interferometer for displacement and angle measurement is met.

1 Claim, 1 Drawing Sheet

(56) References Cited

U.S. PATENT DOCUMENTS

2010/0238456 A1* 9/2010 Speake .............. G01B 9/02018
   356/517
2019/0302263 A1* 10/2019 Wang .................... G01B 11/26
2021/0102802 A1* 4/2021 Matsuura ........... G01B 9/02083

OTHER PUBLICATIONS

Collett, M. J. et al. "Ellipse fitting for interferometry. Part 1: static methods". J. Opt. Soc. Am. A, vol. 31, No. 12, Dec. 2014, pp. 2573-2583. (Year: 2014).*

Watchi, Jennifer et al. "Contributed Review: A review of compact interferometers". Rev. sci. Instrum. 89, 121501, Dec. 21, 2018. (Year: 2018).*

* cited by examiner

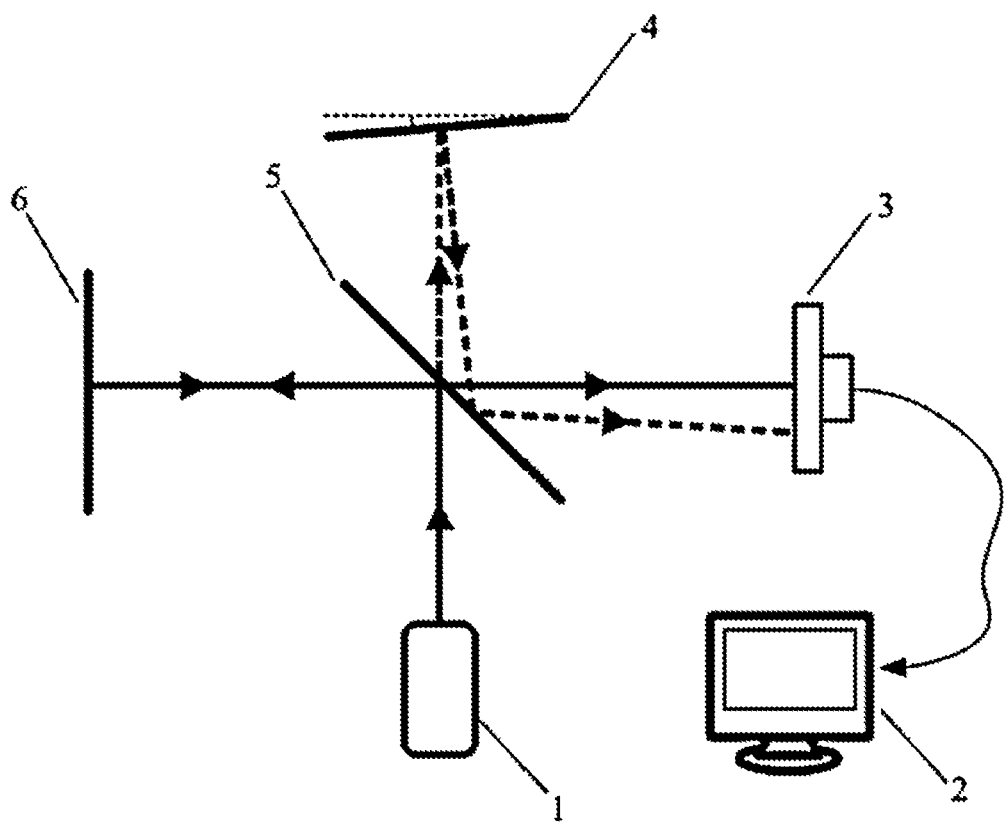

SINGLE-BEAM THREE-DEGREE-OF-FREEDOM HOMODYNE LASER INTERFEROMETER BASED ON ARRAY DETECTOR

CROSS REFERENCE TO RELATED APPLICATION(S)

This application claims foreign priority to Chinese Patent Application No. 202110252643.5 filed on Mar. 9, 2021 and entitled "SINGLE-BEAM THREE-DEGREE-OF-FREEDOM HOMODYNE LASER INTERFEROMETER BASED ON ARRAY DETECTOR", the disclosure of which is incorporated by reference herein in its entirety as part of the present application.

TECHNICAL FIELD

The present disclosure belongs to the technical field of laser application, and mainly relates to a single-beam three-degree-of-freedom homodyne laser interferometer based on an array detector.

BACKGROUND ART

The laser interference measurement technology is a basic core technology in precision engineering, and plays a very important role in the fields of precision measurement, high-end equipment manufacturing, large-scale scientific facility and the like. With rapid development of the field in recent years, the precision of displacement measurement needs to be improved from nanometer magnitude to sub-nanometer magnitude or even picometer magnitude, and meanwhile, the displacement measurement mode needs to be converted from single-axis linear displacement measurement to multi-axis linear/angular displacement three-degree-of-freedom composite measurement.

Currently, laser interferometers based on parallel beam measurement are the most widely used in the field of multi-axis laser interferometry. The laser interferometer based on parallel beam measurement can be divided into homodyne/heterodyne laser interference measurement according to the principle, generally, three-axis (or multi-axis) parallel measurement beams are used for measuring different parts of a measured target at the same time, the measurement beam of each axis achieves single-axis displacement measurement, and the measurement light spots are arranged on the measured target surface in a delta-shaped or L-shaped manner and the like. The three-degree-of-freedom information, including linear displacement, yaw angle and pitch angle, of the measured target can be calculated according to the displacement result obtained by each measurement axis.

Among numerous error sources of laser interferometers, periodic non-linear errors are the main bottleneck that limits the laser interferometers to break through nanometer precision. The Heydemann ellipse fitting correction method can suppress the periodic non-linear error of homodyne laser interferometer to sub-nanometer magnitude (Collett M. J., Tee G. J. Ellipse Fitting for Interferometry. Part 1: Static Methods [J]. J Opt Soc Am A Opt Image Sci Vis, 2014, 31 (12): 2573-2583), and still has a gap with the deep sub-nanometer/picometer magnitude precision requirement of multi-axis laser interferometry. Non-common-path heterodyne interference structures that eliminate optical aliasing can suppress periodic non-linear errors of heterodyne laser interferometers to deep sub-nanometer magnitude, the periodic non-linear errors are suppressed within 10 pm in a non-common-path heterodyne interference structure (Fu H., Wu G., Hu P., et al. Highly Thermal-Stable Heterodyne Interferometer with Minimized Periodic Nonlinearity [J]. Appl Opt, 2018, 57 (6): 1463-1467) proposed by Hu Pengcheng and the like of the Harbin Institute of Technology and a non-common-path heterodyne interference structure (Weichert C., Köchert P., Köning R., et al. A Heterodyne Interferometer with Periodic Nonlinearities Smaller Than ±10 pm[J]. Measurement Science and Technology, 2012, 23 (9): 094005) proposed by Weichert and the like of the Germany PTB, and the component compositions of the non-common-path heterodyne interference structures are complex. Due to the principle, the number of input beams is doubled compared with that of a traditional common-path heterodyne interference structure, periodic nonlinear errors of all measurement axes are coupled and superposed in multi-axis displacement and angle measurement, and therefore the structure is only applied to single-axis measurement at present.

In addition, the laser interferometer based on parallel beams generally adopts a traditional prism set for step-by-step beam splitting, the design and processing difficulty is great, and the parallelism error in the beam splitting process is accumulated along with the increase of the number of incident beams A few laser interferometer tap enterprises such as Keysight (original Agilent), Zygo and the like master a high-precision parallel beam splitting technology realized by utilizing a prism set for step-by-step beam splitting, and a monomer type multi-axis interference mirror set is developed on the basis of the high-precision parallel beam splitting technology. The parallelism of the optical axis of a single three-axis interference mirror set of Keysight company is as high as 25 μrad, but the parallelism of the optical axis of a single five-axis interference mirror set is reduced to 100 gad. In addition, when the measurement distance is large, turbulent flow in the air can cause different degrees of disturbance to each axis of measurement beam, and the measurement stability of displacement and angle is affected.

Another representative technology capable of realizing precise multi-axis laser interference measurement is a differential wavefront laser interferometer based on single-beam measurement, and an included angle exists between wavefronts of two beams of light forming interference in the differential wavefront laser interferometer. A reference interference signal and a measurement interference signal are different in phase difference on each quadrant of a four-quadrant detector, the sum of alternating current signals of four quadrants can be used for calculating displacement, a yaw angle can be calculated by subtracting signals of two left quadrants and two right quadrants, and the pitch angle can be calculated by subtracting the signals of two upper quadrants and two lower quadrants. Representative is the compact differential wavefront interferometer proposed by American scholars Gillmer and the like (Yu X., Gillmer S. R., Ellis J. D. Beam Geometry, Alignment, and Wavefront Aberration Effects on Interferometric Differential Wavefront Sensing [J]. Measurement Science and Technology, 2015, 26 (12): 125203), but the differential wavefront interferometer suffers from the principle error of angle decoupling nonlinearity and directly limits the angle measurement accuracy and angle measurement range, resulting in an angle measurement range that is smaller than conventional heterodyne laser interferometers, generally on the magnitude of 0.1 μrad or below.

Therefore, an existing laser interferometer based on parallel beam measurement has the problems of complex structure, great processing difficulty and multi-axis periodic nonlinear coupling, and a differential wavefront interferometer based on single beam measurement has the problems of angle coupling nonlinearity and smaller angle measurement range, so that the improvement of the three-degree-of-freedom measurement capability of the laser interferometer is severely limited.

SUMMARY

The present disclosure aims to provide a single-beam three-degree-of-freedom homodyne laser interferometer based on an array detector aiming at the defects and shortages of existing three-degree-of-freedom measurement laser interferometers so as to achieve the purpose of comprehensively improving the measurement precision and the angle range of the three-degree-of-freedom laser interferometer.

In order to achieve the purpose, the present disclosure provides the following technical scheme:

A single-beam three-degree-of-freedom homodyne laser interferometer based on an array detector, comprising a first input beam with a single frequency, a Michelson interference structure and an array detection and signal decoupling module; the Michelson interference structure includes a fixed reference plane mirror and a movable target plane mirror; the first input beam is split into a first measurement beam and a first reference beam after entering the Michelson interference structure; the first measurement beam is reflected at least once by the target plane mirror and the first reference beam is reflected at least once by the reference plane mirror; and at least a part of the first measurement beam and at least a part of the first reference beam coincide in an output travel path to form a first single-beam homodyne interference signal.

Additionally, the array detection and signal decoupling module includes an array detector with detection channels distributed in m*n. M is the longitudinal distribution number of the detection channels, namely the row number, n is the transverse distribution number of the detection units, namely the column number, the transverse distribution intervals of the detection channels are not equal, the row number m and the column number n are both larger than or equal to 2, and the product of the row number and the column number is larger than or equal to 4. The detection channels of the array detector can effectively detect the first single-beam homodyne interference signal formed by the first measurement beam and the first reference beam on the output path.

Also, the array detection and signal decoupling module further incudes an upper computer used for achieving three-degree-of-freedom signal linear decoupling on the first single-beam homodyne interference signal through a three-degree-of-freedom decoupling method, and the yaw angle, pitch angle and displacement information of the target plane mirror relative to the reference plane mirror are obtained.

Further, the three-degree-of-freedom decoupling method includes the following steps:

step one, receiving the first single-beam homodyne interference signal and converting the first single-beam homodyne interference signal into a first single-beam homodyne interference light intensity signal by each detection channel of the array detector, wherein a specified light intensity signal I (x, y) is a first single-beam homodyne interference light intensity signal component detected by the detection channel located in the x-th row and the y-th column;

step two, adopting a Lissajous ellipse fitting method, taking any light intensity signal I (x, y) as a horizontal axis reference of Lissajous ellipse fitting, simultaneously performing Lissajous ellipse fitting with the rest of all light intensity signals and calculation to obtain all Lissajous ellipse parameters, wherein the parameters include the major axis radius and the minor axis radius of the Lissajous ellipse, the transverse axis coordinate of the center of the ellipse, the longitudinal axis coordinate of the center of the ellipse and the rotation angle of the ellipse;

step three, performing Lissajous ellipse fitting calculation on the light intensity signal I (x, y) and light intensity signals detected by other detection channels located in the same row to obtain Lissajous ellipse parameters, and calculating the yaw angle of the target plane mirror relative to the reference plane mirror;

step four, performing Lissajous ellipse fitting calculation on the light intensity signal I (x, y) and light intensity signals detected by all detection channels located in the other rows to obtain Lissajous ellipse parameters, and calculating the pitch angle of the target plane mirror relative to the reference plane mirror; and step five, performing Lissajous ellipse fitting calculation on the light intensity signal I (x, y) and light intensity signals detected by the rest of all detection channels to obtain Lissajous ellipse parameters, and calculating the displacement of the target plane mirror relative to the reference plane mirror.

According to the specific embodiments provided by the present disclosure, the present disclosure has the following technical effects:

firstly, the laser interferometer in the present disclosure achieves linear decoupling of three-degree-of-freedom signals for single-beam homodyne interference signals;

secondly, the laser interferometer in the present disclosure has few periodic nonlinear error sources which are only derived from multiple reflections, and no orthogonal detector is used, so that the problems of unequal amplitude of alternating current signals, direct current bias, signal nonorthogonality and the like in orthogonal detection do not exist;

thirdly, the measurement range of the laser interferometer in the present disclosure is large and can reach 10 μrad; firstly, the angle decoupling nonlinear problem does not exist, and the angle measurement range is not limited by decoupling linear intervals; secondly, space fringes generated by angle yaw can reduce the contrast ratio of interference signals in a traditional method, and the angle measurement range is widened in principle by utilizing the fringes to perform angle measurement; and fourthly, the laser interferometer in the present disclosure has the characteristics of concise light path, few components, no polarization device and the like, is beneficial to implementation in engineering, and has the advantages in the aspects of implementation difficulty, integration, cost performance and the like.

BRIEF DESCRIPTION OF THE DRAWING

To describe technical solutions in embodiments of the present disclosure more clearly, the following briefly describes the attached FIGURE required for describing the embodiments.

The FIGURE is a structural schematic diagram of a laser interferometer measuring system in the present disclosure.

DETAILED DESCRIPTION OF THE EMBODIMENTS

The following clearly and completely describes the technical scheme in the embodiments of the present disclosure with reference to the attached FIGURE in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

The present disclosure aims to provide a single-beam three-degree-of-freedom homodyne laser interferometer based on an array detector, so that the measurement accuracy and the angle range of the three-degree-of-freedom homodyne laser interferometer are comprehensively improved.

To make the foregoing objective, features and advantages of the present disclosure clearer and more comprehensible, the present disclosure is further described in detail below with reference to the attached FIGURE and specific embodiments.

As shown in the FIGURE, a single-beam three-degree-of-freedom homodyne laser interferometer based on an array detector includes a laser light source 1, an upper computer 2, an array detector 3, a fixed reference plane mirror 4, a first beam splitting surface 5 plated with an unpolarized beam splitting film (not shown) and a movable target plane mirror 6.

The laser light source 1 provides a first input beam. The fixed reference plane mirror 4, the first beam splitting surface 5 and the movable target plane mirror 6 form a Michelson interference structure. The upper computer 2 and the array detector 3 form an array detection and signal decoupling module.

The reflective surface of the fixed reference plane mirror 4 is non-perpendicular to a first reference beam, so that a first measurement beam and the first reference beam are transmitted non-coaxially in an output travel path, and the reflective surface and the dotted line reference surface as shown in the FIGURE form a slight included angle which is usually in the magnitude of milliradians.

The distribution of detection channels of the array detector 3 is 2*4, 2 is the longitudinal distribution number of the detection channels, namely the row number, 4 is the transverse distribution number of the detection units, namely the column number, and the transverse distribution distances of the detection channels are not equal; the detection channels of the array detector 3 can effectively detect a first single-beam homodyne interference signal formed by the first measurement beam and the first reference beam on the output path.

The working principle of the laser interferometer is as follows: after the first input beam is incident to the first beam splitting surface 5, the reflected beam forms the first measurement beam, and the transmitted beam forms the first reference beam; wherein the first measurement beam is reflected after being in contact with the movable target plane mirror 6 and is transmitted and output after passing through the first beam splitting surface 5; meanwhile, the first reference beam is in contact with the fixed reference plane mirror 4 to be reflected and is reflected and output after passing through the first beam splitting surface 5; at least a part of the output first measurement beam and at least a part of the output second reference beam coincide in the output travel path to form a first single-beam homodyne interference signal. The upper computer 2 can achieve three-degree-of-freedom signal linear decoupling on the first single-beam homodyne interference signal through a three-degree-of-freedom decoupling method, and the yaw angle, pitch angle and displacement information of the target plane mirror 6 relative to the reference plane mirror 4 are obtained.

The three-degree-of-freedom decoupling method includes the following steps:

Step one, receiving the first single-beam homodyne interference signal and converting the first single-beam homodyne interference signal into a first single-beam homodyne interference light intensity signal by each detection channel of the array detector 3, wherein a specified light intensity signal I (x, y) is a first single-beam homodyne interference light intensity signal component detected by the detection channel located in the x-th row and the y-th column.

Step two, adopting a Lissajous ellipse fitting method, taking the light intensity signal I (1, 1) as a horizontal axis reference of Lissajous ellipse fitting, simultaneously performing Lissajous ellipse fitting with the rest of all light intensity signals and calculation to obtain all Lissajous ellipse parameters, wherein the parameters include the major axis radius and the minor axis radius of the Lissajous ellipse, the transverse axis coordinate of the center of the ellipse, the longitudinal axis coordinate of the center of the ellipse and the rotation angle of the ellipse.

Step three, performing Lissajous ellipse fitting calculation on the light intensity signal I (1, 1) and light intensity signals detected by other detection channels located in the same row to obtain Lissajous ellipse parameters, and calculating the yaw angle of the target plane mirror 6 relative to the reference plane mirror 4.

Step four, performing Lissajous ellipse fitting calculation on the light intensity signal I (1, 1) and light intensity signals detected by all detection channels located in the other rows to obtain Lissajous ellipse parameters, and calculating the pitch angle of the target plane mirror 6 relative to the reference plane mirror 4.

Step five, performing Lissajous ellipse fitting calculation on the light intensity signal I (1, 1) and light intensity signals detected by the rest of all detection channels to obtain Lissajous ellipse parameters, and calculating the displacement of the target plane mirror 6 relative to the reference plane mirror 4.

Several examples are used for illustration of the principles and implementation methods of the present disclosure. The description of the embodiments is used to help illustrate the method and the core principles of the present disclosure; and meanwhile, those skilled in the art can make various modifications in terms of specific embodiments and scope of application in accordance with the teachings of the present disclosure. In conclusion, the content of this specification shall not be construed as a limitation to the present disclosure.

The invention claimed is:

1. A single-beam three-degree-of-freedom homodyne laser interferometer based on an array detector, comprising a first input beam with a single frequency, a Michelson interference structure and an array detection and signal decoupling module;
   wherein the Michelson interference structure comprises a fixed reference plane mirror and a movable target plane mirror;
   wherein the first input beam is split into a first measurement beam and a first reference beam after entering the Michelson interference structure; the first measurement beam is reflected at least once by the target plane mirror and the first reference beam is reflected at least once by the reference plane mirror; and at least a part of the first measurement beam and at least a part of the first reference beam coincide in an output travel path to form a first single-beam homodyne interference signal;

wherein a reflective surface of the fixed reference plane mirror is non-perpendicular to the first reference beam so that the first measurement beam and the first reference beam are transmitted non-coaxially in the output travel path;

wherein the array detection and signal decoupling module comprises the array detector with detection channels distributed in m×n and an upper computer, m is a row number of the detection channels, n is a column number of the detection channels, transverse distribution intervals of the detection channels are not equal, the row number m and the column number n are both larger than or equal to 2, and a product of the row number m and the column number n is larger than or equal to 4; and the detection channels of the array detector are configured to detect the first single-beam homodyne interference signal formed by the first measurement beam and the first reference beam on the output travel path; and wherein each of the detection channels of the array detector is configured to receive the first single-beam homodyne interference signal and convert the first single-beam homodyne interference signal into a first single-beam homodyne interference light intensity signal, wherein a light intensity signal I (x, y) is set as a first single-beam homodyne interference light intensity signal component detected by the detection channel located in a x-th row and a y-th column;

wherein the upper computer is configured to perform three-degree-of-freedom signal linear decoupling on the first single-beam homodyne interference signal, and specifically configured to:

adopt a Lissajous ellipse fitting method, take the light intensity signal I (x, y) as a horizontal axis reference of Lissajous ellipse fitting, perform the Lissajous ellipse fitting method on the light intensity signal I (x, y) and other light intensity signals to obtain all Lissajous ellipse parameters, wherein the Lissajous ellipse parameters comprise a major axis radius and a minor axis radius of a Lissajous ellipse, a transverse axis coordinate of a center of the Lissajous ellipse, a longitudinal axis coordinate of the center of the Lissajous ellipse and a rotation angle of the Lissajous ellipse;

perform a first Lissajous ellipse fitting calculation on the light intensity signal I (x, y) and light intensity signals detected by other detection channels located in a same row with the light intensity signal I (x, y) to obtain Lissajous ellipse parameters, and calculate a yaw angle of the target plane mirror relative to the reference plane mirror;

perform a second Lissajous ellipse fitting calculation on the light intensity signal I (x, y) and light intensity signals detected by detection channels located in another row different from that of the light intensity signal I (x, y) to obtain Lissajous ellipse parameters, and calculate a pitch angle of the target plane mirror relative to the reference plane mirror; and perform a third Lissajous ellipse fitting calculation on the light intensity signal I (x, y) and the other light intensity signals to obtain Lissajous ellipse parameters, and calculate displacement of the target plane mirror relative to the reference plane mirror.

* * * * *